Oct. 30, 1928.

L. MARX 1,689,954

SUPPORT OR HOLDER FOR CUT FLOWERS AND THE LIKE

Filed Oct. 31, 1927

Inventor.
Léon Marx
By George A. Prevost
Atty.

Patented Oct. 30, 1928.

1,689,954

UNITED STATES PATENT OFFICE.

LÉON MARX, OF LONDON, ENGLAND.

SUPPORT OR HOLDER FOR CUT FLOWERS AND THE LIKE.

Application filed October 31, 1927, Serial No. 229,908, and in Great Britain December 30, 1926.

This invention relates to improvements in supports or holders for cut flowers and the like, of the kind used in bowls and other vessels containing water.

According to the invention, I provide a float of any suitable shape and dimensions and composed of a material which is buoyant and preferably porous, such as cork and in which are provided holes for the reception of the stems of the flowers to be supported, which are maintained in a substantially upright position by the buoyant body floating on the surface of the water in the bowl or other vessel.

In practice, grass seed may be sprinkled on the float and/or bulbs may be placed thereon making, when these have germinated, a miniature floating garden.

Figure 1:
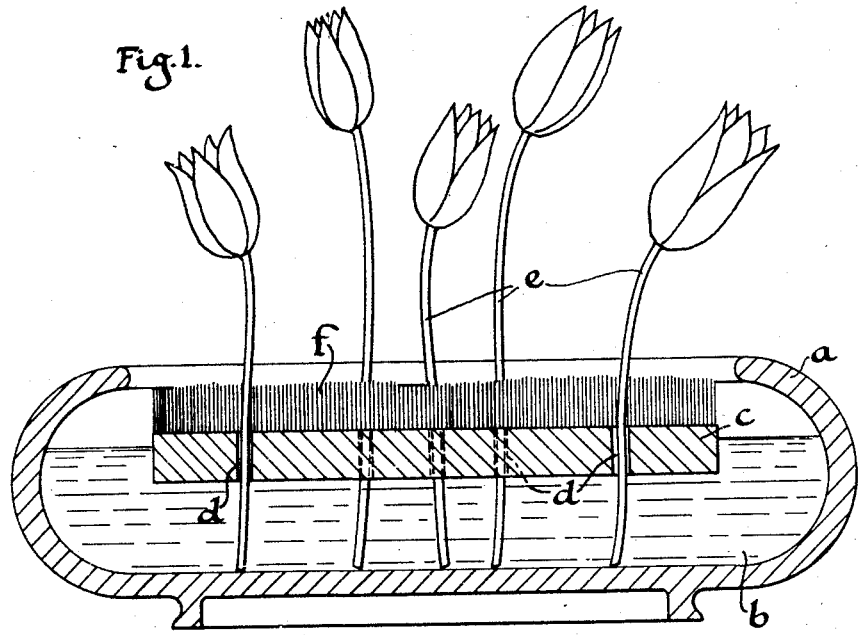
Figure 2:
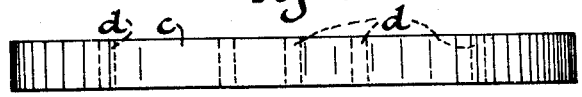
Figure 3:
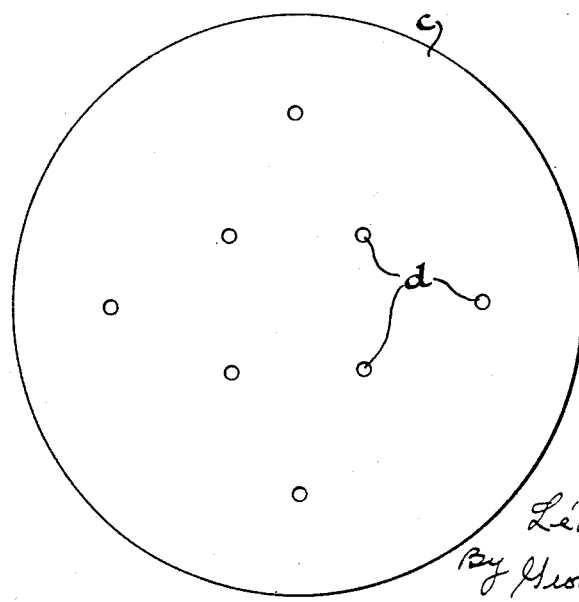

In order that the invention may be fully understood, I will describe it by reference to the accompanying drawing, in which:

Figure 1 is a vertical section showing the float supporting the cut flowers in a flower bowl in accordance with the invention, Figure 2 is an elevation of the float and Figure 3 is a plan view thereof.

$a$ is the bowl containing water $b$, $c$ is the float here shown in the form of a single piece of cork or the like which floats on the surface of the water $b$. $d, d$ are the holes or perforations formed in the float $c$ for the reception of the stems $e$ of the flowers. $f$ represents grass growing on the floating disc $c$ and forming a miniature floating lawn.

Although I have shown the buoyant body as an integral solid piece of cork or the like, it is to be understood that the said buoyant body may be made in two or more pieces rigid or otherwise connected together. Also that the said body may be made hollow and the holes or perforations arranged in other suitable ways.

I claim:

1. A support for cut flowers, comprising a body of material of less density than water, adapted to float in a water filled flower bowl, said body having a plurality of apertures therein for receiving the stems of flowers, whereby said stems are enabled to extend therethrough into said water.

2. A support for cut flowers as claimed in claim 1 wherein said body is composed of cork.

LÉON MARX.